Feb. 20, 1934. A. H. MOECKER 1,948,427
OIL MILEAGE INDICATOR
Filed Dec. 2, 1932  2 Sheets-Sheet 1
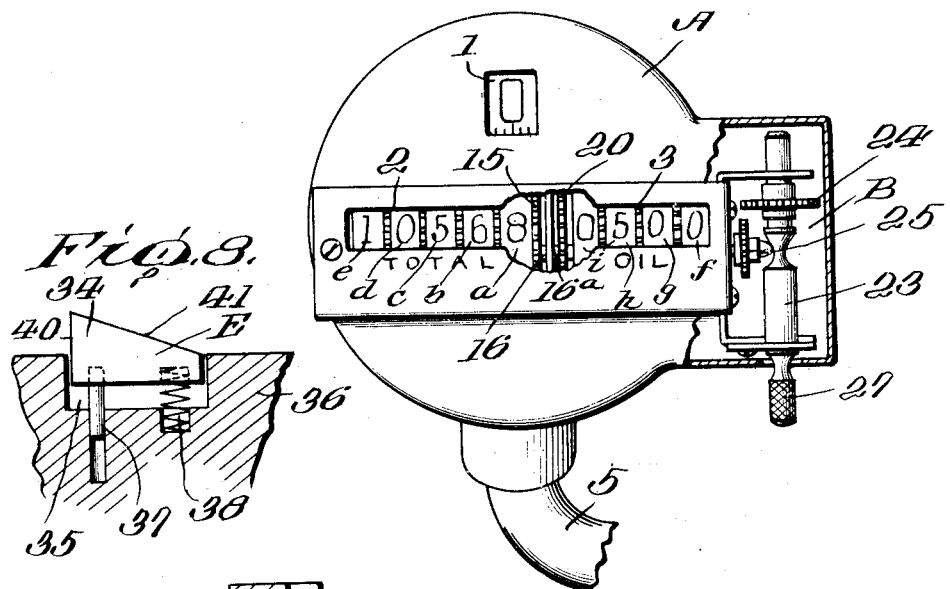
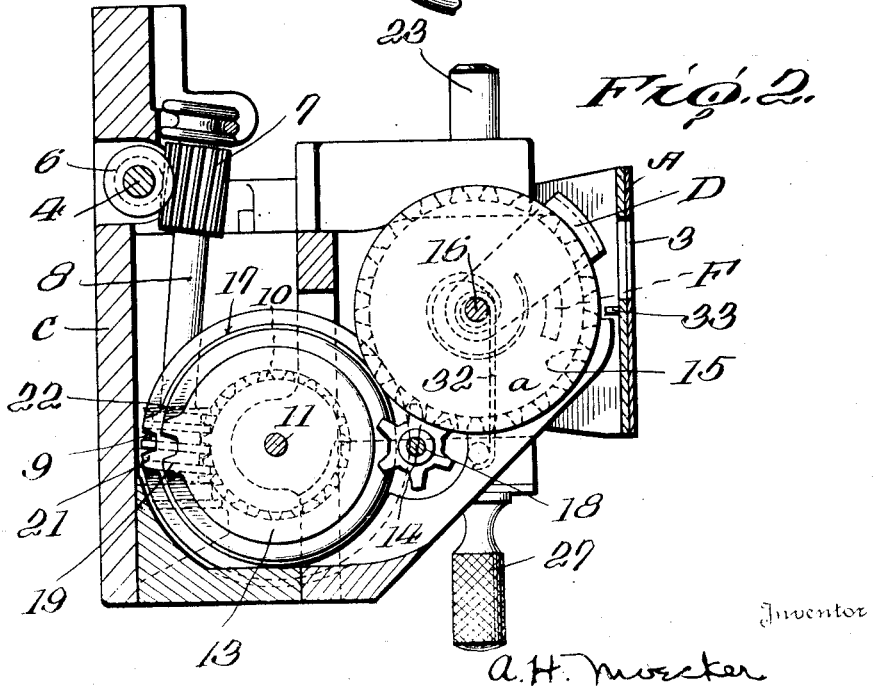
Inventor
A. H. Moecker Feb. 20, 1934.  A. H. MOECKER  1,948,427
OIL MILEAGE INDICATOR
Filed Dec. 2, 1932  2 Sheets-Sheet 2
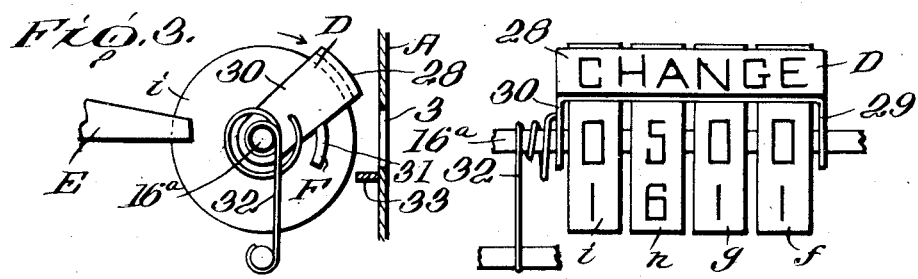
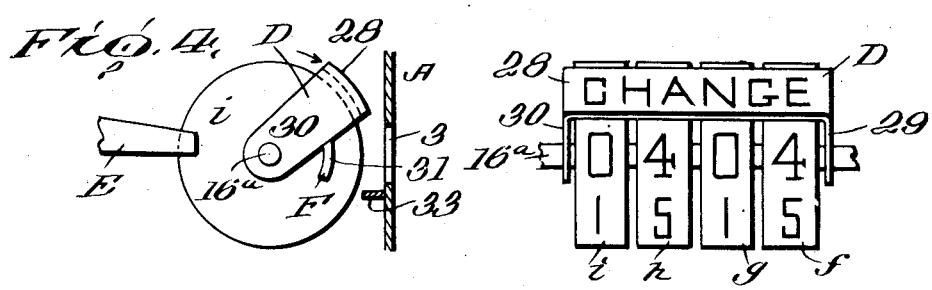
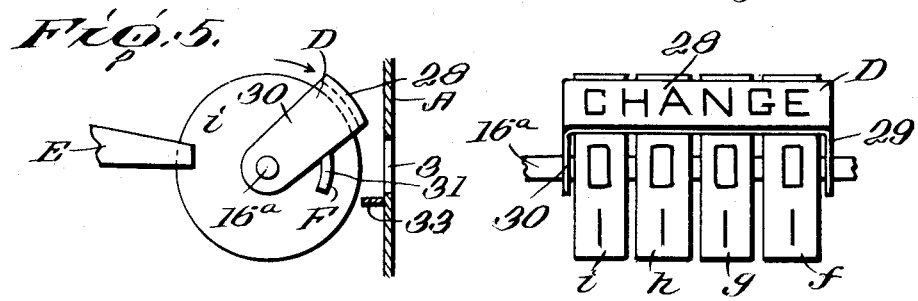
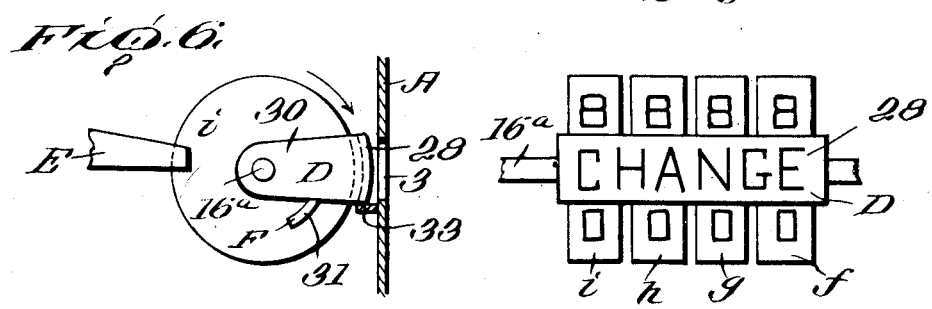
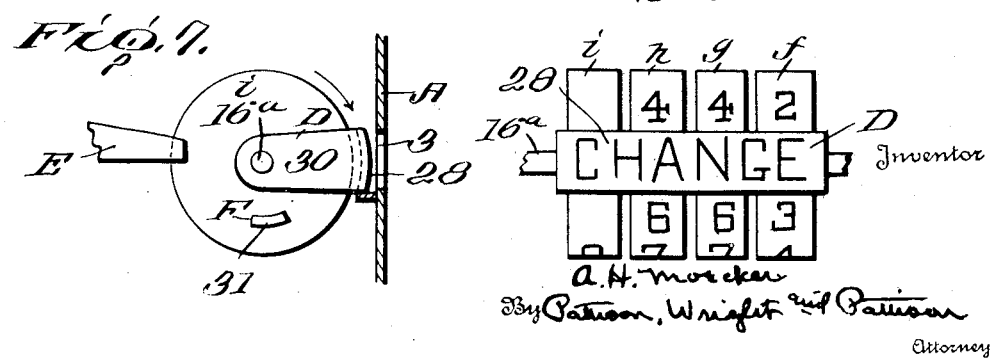

Patented Feb. 20, 1934

1,948,427

UNITED STATES PATENT OFFICE 1,948,427

OIL MILEAGE INDICATOR

Arnold H. Moecker, Homewood, Ill.

Application December 2, 1932. Serial No. 645,461

18 Claims. (Cl. 40—41)

This invention relates to improvements in oil mileage indicators for appraising the driver of a motor vehicle the proper time for renewing the oil in the crank case of the vehicle motor.

A great many different manners and ways of indicating the proper time at which to renew the oil in the motor of a motor vehicle have been proposed, but the present indicator is believed to be a vast improvement over any manner heretofore proposed and has the advantage of being automatic in operation after once having been set.

The present indicator is built into the ordinary automobile speedometer, which at the present day includes a cyclometer for indicating the mileage covered by the vehicle as well as the speed of the vehicle. Consequently the time at which the indicator registers a need for changing the oil is based upon the mileage covered by the vehicle.

The present invention includes a visible means for indicating at all times the exact number of miles left to be driven before the oil change should take place, and additionally provides a signaling means for indicating positively after the set oil mileage has been used up, that the oil should be changed, and this signaling means remains visible to the driver until he has manually removed it.

Thus the present invention provides an oil mileage indicator which at all times registers the remaining mileage in the oil of the motor up until said mileage is utilized and then provides a signal for indicating that the total oil mileage has been used and that the oil should be changed.

In the present drawings illustrating the present improved invention, Fig. 1 is a view in front elevation of a combined speedometer and cyclometer, a portion of the view being broken away to illustrate the cyclometer oil mileage resetting means.

Fig. 2 is a transverse vertical sectional view through the instrument.

Figures 3, 4, 5, 6 and 7 are diagrammatic views illustrating the operation of the indicator.

Fig. 8 is a detailed view partly in section illustrating the wedge lug for supporting the set position of the signal.

Having reference now to the drawings for the purpose of describing the invention, A indicates a speedometer such as is commonly found on motor vehicles today and comprises a speedometer and cyclometer in combination.

This instrument visibly registers the speed upon a tape, the figures upon which can be seen through the opening 1 in the speedometer face. The total mileage covered by the vehicle is registered by the cyclometer portion of the instrument in the usual and well known manner and is visible through the opening 2 in the speedometer face.

Ordinarily the cyclometer feature on automobile speedometers provides for registering a visible indication of the trip mileage of the vehicle, but in the present invention this trip mileage indicator is utilized for indicating the oil mileage and the record is visible through the opening 3 in the speedometer face.

The resetting means for the oil mileage indicator is indicated as an entirety by B and will be described in detail hereinafter.

Having reference to Figures 1 and 2 of the drawings it will be seen that the speedometer is contained within a suitable housing C which in the ordinary practice is secured on, in, or about the dash or instrument board of the motor vehicle where it is conveniently visible to the driver of the car. For the purpose of recording both the speed and the mileage of the vehicle the horizontally disposed shaft 4 has driving connection with the wheels or drive shaft of the vehicle through a flexible cable (not shown) which is contained within the conduit 5.

The end of the flexible cable has driving connection with the speed recording feature of the speedometer but inasmuch as this forms no part of the present invention no description of it will be given.

The shaft 4 carries a worm gear 6 which has driving connection with the worm gear portion 7 at the upper end of the vertically disposed shaft 8 the lower end of which is provided with a worm gear 9 which has driving connection with the gear wheel 10 on the stub shaft 11.

The mechanism and operation of the cyclometer is well known and the operation of the present cyclometer will not be gone into in detail but only sufficiently to point out the fact that the oil mileage registering portion of the cyclometer revolves in a reverse direction to the mileage total register portion of the cyclometer.

The five wheels or discs which carry the numerals for registering the total mileage traveled by the vehicle are mounted upon the horizontally disposed shaft 16 which shaft carries and is rotated by a gear wheel 15. A small idler gear 14 mounted upon a stub shaft 18 has driving connection with the gear 15. This idler gear is driven by the teeth 19 in the disc or wheel 13, which disc or wheel is fixed to rotate with the shaft 11 which shaft is in turn rotated by the gear 10 heretofore mentioned.

The gear 15 is fixed to the small wheel or disc a which registers the units of mileage total. By suitable interconnection between all of the mileage registering disc designated at b, c, d and e, the mileage traveled is totalized and registered in the opening 2 in the speedometer face to be visibly read by the driver of the machine.

The discs or wheels carrying the numerals for registering the oil mileage are designated as f, g, h and i and are supported upon the shaft 16a which is horizontally arranged in alignment with the previously mentioned shaft 16 but separate therefrom so far as driving connection is concerned. This shaft 16a carries a gear 20 which is driven by the teeth 21 of the wheel 22 through direct connection therewith. In other words there is no idler in the drive for the oil mileage total with the consequence that the designating members are rotated in a reverse direction to the discs carrying the vehicle total mileage. Thus the vehicle mileage total register is constantly increasing or adding up when the vehicle is driven whereas the oil mileage register is subtracting or decreasing in number of miles of its showing as the vehicle is driven.

There is of course the usual interconnection between the oil total registering wheels f, g, h and i to provide an operation so the proper disc rotates at the proper time to indicate the mileage traveled, all of which is conventional in well known cyclometers.

The resetting device designated as an entirety by B comprises a vertically movable shaft 23 carrying a horizontally disposed gear wheel 24 which is normally out of engagement with the gear wheel 25 carried by the outer end 26 of the shaft 16a. By moving the shaft 23 downwardly and rotating it manually by manipulation of its extending knurled end 27 the shaft 16a can be rotated to obtain any desired mileage setting of the figure carrying wheels which designate the oil mileage.

The actual oil signal heretofore mentioned is designated as an entirety by D and comprises a strip of metal bent into a U-shape having a central portion 28 which extends across the faces of all the numeral carrying wheels f, g, h and i and has printed upon it "Change". The extending ends 29 and 30 of the signal are bent down to parallel the outer walls of the wheels f and i respectively and are provided with openings so that the signal is loosely supported upon the shaft 16a. The outer side wall or face of the wheel i which represents the thousand column of the register carries an outwardly extending lug or support F which holds this signal normally in a position elevated above the opening 3 in the speedometer face against the tension of the coil spring 32, which spring incidentally is exerting a normally downward pull upon the signal, as will be clearly evident from Fig. 3 of the drawings.

The movement of this signal D, when movement is permitted, is in a clockwise direction but its extreme limit of movement downward is to a position whereby the word "Change" is in alignment with the opening 3 in the speedometer face A. Further downward movement of the signal is prevented by the outwardly struck lip or stop 33 positioned upon the rear side or wall of the speedometer face A at a point just below the opening 3 therein.

By reference to Fig. 8 of the drawings it will be seen that the support F comprises a wedge-like member 34 which is reciprocable within a cut-out portion 35 in wheel i of the cyclometer. This wedge is guided in its movement upon an extending pin 37 and is normally held in extended position by a coil spring 38. This stop is so positioned that its vertical wall 40 is presented to and supports the signal D, as illustrated in Fig. 3 of the drawings, whereas its tapered face 41 is presented to the signal D in a clockwise movement of that member and as a consequence will be depressed and pass under the signal arm 30 as long as the wheel i continues to rotate and the signal is supported upon the lip 33, as illustrated in Fig. 7 of the drawings.

To prevent moving the signal D in a non-clockwise direction back of a point where the register reading of the oil mileage would be greater than 3500 miles there is provided a stop E. Incidentally the position of this stop E is such as not to be in the path of travel of the stop or support F carried by the numeral wheel i.

Operation

In order to clarify the construction as well as to explain its use, its operation is described as follows: The oil mileage register is manually set at a given total which is the total previously decided upon by the motorist as the mileage he wishes to drive upon a new filling of oil in the vehicle motor. The mileage to be driven on each filling of oil is optional with the driver and can vary from 3500 miles downward.

In the drawings the mileage selected by the motorist is illustrated at 500 miles and upon the changing of his oil the motorist can set the oil mileage register at this mileage total.

It will be seen that the setting of the register in this manner has caused the lug or support F to lift the signal D upward beyond the opening 3 in the speedometer face thus leaving clear to the vision of the driver the oil mileage register portion of the cyclometer.

In Figures 4 and 5 is illustrated the fact that the car has been driven 500 miles and the register is about to indicate a showing of 9,999 miles upon its next movement. As the register wheels move downwardly to register the above noted total the 1000 total wheel i moves in a clockwise direction thus permitting the downward movement of the signal D into the position illustrated in Figure 6 of the drawings, where it will be seen that in the aperture 3 in the speedometer will appear the word "Change". For the purpose of attracting attention this signal could be colored, red, blue or some other striking color to attract the attention of the driver to the fact that he has driven out the oil mileage intended on the present oil in the motor and that the oil should be drained and new oil provided.

However, in the event that immediate change of oil and a resetting of the oil mileage total is not made no breakage in the mechanism will take place as the clockwise movement of the 1000 registering wheel i is permitted. The lug F will travel away from the signal D as illustrated in Fig. 7 of the drawings but the word "Change" will remain in the vision of the driver of the vehicle in back of the speedometer face aperture 3.

If the driver continues to neglect the resetting of the oil mileage any number of complete revolutions of the 1000 register wheel i will be permitted as the stop F will pass beneath the arm 30 of the signal, as explained, through depression of the lug F against its spring 38.

From the foregoing it will be seen that when a driver renews the oil in his motor he can set the oil mileage at any desired total between zero and 3500 miles and be assured that when he has run out the mileage set he will be visually apprised of that fact by the appearance of a signal indicating that the oil in the motor should be changed.

Additionally the driver has the benefit of knowing at all times the remaining mileage left of any oil filling of the motor.

Outside of the fact that the setting of the device is manual its further operation is automatic which is a very desirable feature and the driver is consequently provided with a dependable indicator or annunciator for advising him when to renew the motor oil.

Attention is directed to the fact that it is not absolutely essential to the operation of applicant's device to have the oil mileage recording wheels of the cyclometer rotate in a reverse direction to that of the mileage total recording wheels. The recording wheels of both the mileage total and the oil mileage could rotate in the same direction and the same result and operation could be had by printing the numerals of the oil mileage wheels in a reverse order. By printing the numerals of the oil mileage wheels in reverse order these wheels would subtract mileage rather than add it even though the wheels were rotating in the same direction as the total mileage recording wheels.

As a consequence the manner in which the subtracting feature of the oil mileage is accomplished would be dependent upon the particular speedometer construction. It is intended to adapt the present invention to speedometers now on the market by a very slight modification of them. Due to a particular speedometer construction it might be more simple to reverse the number reading on the oil mileage wheels rather than to alter the drive of the cyclometer to provide for rotating the oil mileage recording wheels in a direction reverse to that of the total mileage recording wheels. However that may be, it will be at once apparent that my invention can be applied to speedometers now in use by very slight change in them and thus provide the motor vehicle operator with a safe and sure oil change indicator.

Having thus described my invention, what I claim and desire to secure by Letters Patent is:

1. For use with a motor vehicle, a motor oil change indicator, comprising a cyclometer adapted to be manually set at a given mileage total and to be operated automatically by the movement of said vehicle to subtract from said mileage total showing, and a signal movable over and concealing the mileage indication of said cyclometer upon the travel of the vehicle a set number of miles.

2. For use with a motor vehicle, a motor oil change indicator, comprising a cyclometer adapted to be manually set at a given mileage total and to be operated automatically by the movement of said vehicle to subtract from said mileage total showing, and a means carrying information to indicate the time for a change of motor oil movable over and hiding said cyclometer reading, for the purpose described.

3. For use with a motor vehicle, a motor oil change indicator, comprising a cyclometer made up of a series of wheels carrying numerals representing the units, tens, hundreds, and thousands of miles traveled, a housing for said meter having an aperture through which one line of numerals across the several wheels is visible, a signal carrying reading matter extending across the face of all of said numeral carrying wheels, means carried by the thousand registering numeral wheel for normally supporting said signal in a non-visible position, said supporting means permitting the movement of said signal upon a movement of the thousands registering wheel into a visible position, and means for supporting and retaining said signal in a visible position until the same has been manually removed, and means to reset said cyclometer to move said signal into a non-visible position.

4. For use with a motor vehicle, a motor oil change indicator, comprising a cyclometer having mileage registering wheels and a signal, a housing for said cyclometer having therein an aperture through which the cyclometer readings are visible, a signal positioned between the aperture and mileage registering wheels, means forming a part of the mileage registering wheels of said cyclometer for normally supporting said signal in a non-visible position, and said supporting means permitting the movement of said signal to a visible position behind said aperture and in front of said mileage registering wheels upon a recording of a set number of miles registered by said cyclometer.

5. For use with a motor vehicle, a motor oil change indicator, comprising a cyclometer including a series of independently movable mileage registering wheels, a housing for said cyclometer having therein an aperture through which a horizontal line of figures on said mileage recording wheels is visible, a signal spanning said mileage recording wheels and carrying thereon wording, means to normally hold said signal out of alignment with said aperture, said means forming a part of said mileage recording wheels and movable into a position behind said aperture upon the recording of a set mileage by said cyclometer, means to manually set the cyclometer at a given mileage reading, and means to drive said cyclometer so that its mileage reading is subtracting from said set mileage recording, for the purpose described.

6. For use with a motor vehicle, a motor oil change indicator, comprising a cyclometer adapted to be operated automatically by the movement of said vehicle, and a signal movable into a position in front of said mileage indication of said cyclometer upon the travel of the vehicle a given number of miles.

7. For use with a motor vehicle, a motor oil change indicator, comprising a cyclometer adapted to be operated automatically by the movement of said vehicle to subtract from said mileage total showing, and a signal movable into a position in front of the mileage indication of said cyclometer upon the travel of the vehicle a given number of miles.

8. For use with a motor vehicle, a motor oil change indicator, comprising a cyclometer adapted to be set at a given mileage total and to be operated automatically by the movement of said vehicle to subtract from said mileage total showing, and a signal to indicate the time for a change of motor oil movable into a position in front of the said cyclometer reading at a predetermined mileage reading, for the purpose described.

9. For use with a motor vehicle, a motor oil change indicator comprising a housing having an aperture therein, a cyclometer within said housing comprising a series of mileage registering wheels visible through said housing aperture, said cyclometer wheels being operated automatically by the movement of said vehicle to indicate the mileage total travel of the vehicle, and a signal to indicate the time for a change of motor oil movable into a position between said housing aperture and said mileage registering wheels, for the purpose described.

10. For use with a motor vehicle, a motor oil change indicator comprising a cyclometer made up of a series of wheels carrying numerals representing the total of miles traveled by the vehicle, a housing for said cyclometer having an aperture through which the numerals of said wheels are visible, a signal movably supported between said and said wheels, means carried by one of said wheels for normally supporting said signal in a non-visible position within the housing, and said signal supporting means permitting the movement of said signal into a position visible through said aperture upon the travel of the vehicle a given number of miles.

11. For use with a motor vehicle, a motor oil change indicator, comprising a cyclometer made up of a series of wheels carrying numerals representing the total mileage travel of the vehicle, a housing for said cyclometer having an aperture through which the numerals of said wheels are visible, a signal movably supported in a position between the aperture and the wheels, means carried by one of said wheels for normally supporting said signal in a non-visible position within the housing, said supporting means permitting movement of said signal into a position visible through said aperture upon the travel of the vehicle a given number of miles, and means for supporting and retaining said signal in a visible position in the event of the travel of the vehicle a distance greater than the given number of miles.

12. For use with a motor vehicle, a motor oil change indicator, comprising a cyclometer made up of a series of wheels carrying numerals, said cyclometer adapted to be set at a given mileage total and to be operated automatically by the movement of said vehicle to subtract from said mileage total showing, a housing for said cyclometer having an aperture through which the numerals across the several wheels are visible, a signal movably mounted between said wheels and said aperture, means carried by one of said wheels for normally supporting said signal in a non-visible position within said housing, and said supporting means permitting the movement of said signal into a position visible through said aperture upon the travel of the vehicle a predetermined mileage.

13. For use with a motor vehicle, a motor oil change indicator, comprising a cyclometer including a series of independently movable mileage registering wheels, a housing for said cyclometer having therein an aperture through which a horizontal line of figures on said mileage recording wheels is visible, a signal movably supported between said mileage recording wheels and said aperture, means forming a part of said mileage recording wheels for normally holding said signal out of alignment with said aperture, means to set said mileage recording wheels at any desired mileage total, means associated with and operated by the vehicle movement to drive said mileage recording wheels so that they subtract from the set mileage total, and said signal supporting means permitting the movement of the signal into a visible position upon a reading of zero miles.

14. A motor oil change indicator of the construction defined in claim 13, wherein a support is provided for supporting and maintaining the signal in a visible position upon the travel of the vehicle a distance greater than the original set mileage total of the cyclometer.

15. For use with a motor vehicle, a motor oil change indicator, comprising a cyclometer including a series of independently movable mileage registering wheels, a housing for said cyclometer having therein an aperture through which a horizontal line of figures on said mileage recording wheels is visible, a shaft for supporting said mileage registering wheels, a signal rotatably supported on said shaft and movable in the space between the mileage registering wheels and the aperture, means carried by one of said wheels for normally supporting said signal in non-visible visible position within the housing, and said signal supporting means permitting the movement of said signal into a position visble through said aperture upon a predetermined mileage total showing of said mileage registering wheels.

16. For use with a motor vehicle, a motor oil change indicator comprising a cyclometer and a signal, said cyclometer adapted to be set at a given mileage total and be operated automatically by the movement of said vehicle to subtract from said mileage total showing, and the signal operated by the cyclometer when the cyclometer has subtracted a given mileage total, for the purpose described.

17. For use with a motor vehicle, a motor oil change indicator, comprising a housing having therein a cyclometer, said housing provided with an aperture through which the mileage indicating medium of said cyclometer is visible, a signal movably supported between said aperture and said cyclometer mileage reading indicator, movable means for normally supporting said signal in a non-visible position within the housing, and said signal supporting means being moved to permit the movement of said signal into a position visible through said aperture upon the travel of the vehicle a given number of miles.

18. A motor oil change indicator of a construction such as defined in claim 17, wherein a fixed support is provided for supporting the signal after the same has moved into its visible position.

ARNOLD H. MOECKER.